United States Patent
Ku et al.

(10) Patent No.: US 8,467,198 B2
(45) Date of Patent: Jun. 18, 2013

(54) DC-TO-AC CONVERTING CIRCUIT WITH WIDE INPUT VOLTAGE

(75) Inventors: Chen-Wei Ku, Taoyuan Hsien (TW); Lei-Ming Lee, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 435 days.

(21) Appl. No.: 12/973,445

(22) Filed: Dec. 20, 2010

(65) Prior Publication Data

US 2011/0157928 A1  Jun. 30, 2011

(30) Foreign Application Priority Data

Dec. 29, 2009 (TW) .............................. 98145644 A (51) Int. Cl.
  *H02M 3/335* (2006.01)
  *H02M 7/5387* (2007.01)
(52) U.S. Cl.
  USPC .............................................. 363/17; 363/132

(58) Field of Classification Search
  USPC .......................... 363/16, 17, 97, 98, 131, 132
  See application file for complete search history.

(56) References Cited

U.S. PATENT DOCUMENTS

| | | | | |
|---|---|---|---|---|
| 5,852,555 | A | * | 12/1998 | Martin ............................ 363/71 |
| 6,617,820 | B2 | * | 9/2003 | Carlson et al. ................ 318/727 |
| 2012/0033469 | A1 | * | 2/2012 | Mohr et al. ..................... 363/98 |

* cited by examiner

*Primary Examiner* — Matthew Nguyen
(74) *Attorney, Agent, or Firm* — Kirton McConkie; Evan R. Witt (57) ABSTRACT

A DC-to-AC converting circuit includes a transformer, a first modulation switching circuit, a second modulation switching circuit and a third modulation switching circuit, an inverter switching circuit and a controlling unit. Under control of the controlling unit, two of the first, second and third modulation switching circuits are selectively enabled according to the magnitude of the input voltage, so that electric energy of the input voltage is magnetically transmitted to the first primary winding, a second primary winding or a serially-connected winding assembly of the first primary winding and the second primary winding, and a turn ratio of the transformer is adjustable.

21 Claims, 5 Drawing Sheets

DC-TO-AC CONVERTING CIRCUIT WITH WIDE INPUT VOLTAGE

FIELD OF THE INVENTION

The present invention relates to a DC-to-AC converting circuit, and more particularly to a DC-to-AC converting circuit with a wide input voltage range.

BACKGROUND OF THE INVENTION

Fossil fuels such as petroleum and coal are widely used in automobiles or power plants for generating motive force or electrical power. As known, burning fossil fuels produces waste gases and carbon oxide. The waste gases may pollute the air. In addition, carbon dioxide is considered to be a major cause of the enhanced greenhouse effect. It is estimated that the world's oils supply would be depleted in the next several decades. The oil depletion may lead to global economic crisis.

Consequently, there are growing demands on renewable energy. The common renewable energy includes for example solar energy, wind power, tide energy, terrestrial heat, biomass energy, and the like. Among various renewable energy sources, solar energy is expected to replace fossil fuel as a new energy source because it provides clean energy without depletion. As a consequence, the solar energy is gradually adopted for establishing a distributed power supply system.

Although the solar energy has broad scope of application, there are still some drawbacks. For example, the solar generator is usually used for the household customers. Since the input voltage of the DC-to-AC converting circuit (or photovoltaic inverter) used in the solar generator is dependent on the magnitude of the input voltage generated by the solar cell, the output voltage of the photovoltaic inverter is decreased as the intensity of the solar beam becomes weak.

Figure 1:
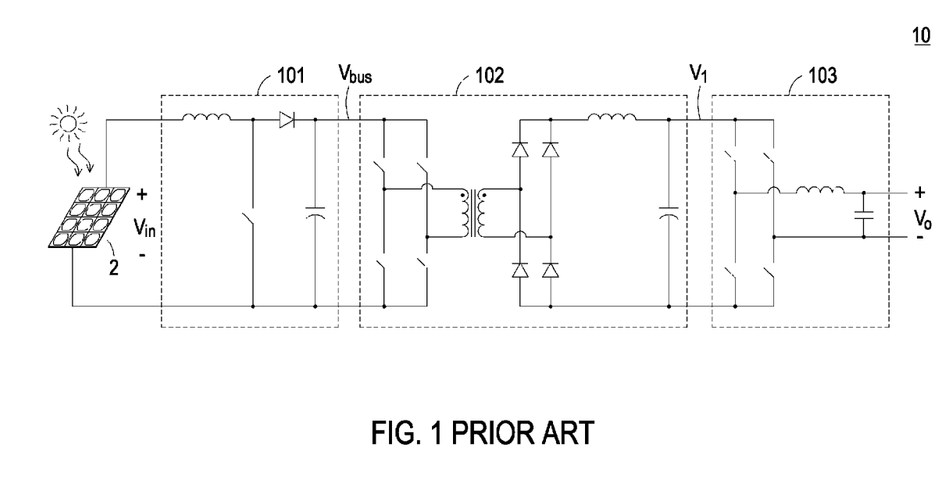
FIG. 1 is a schematic circuit diagram illustrating a photovoltaic inverter according to the prior art.

FIG. 1 is a schematic circuit diagram illustrating a photovoltaic inverter according to the prior art. As shown in FIG. 1, the photovoltaic inverter 10 includes a front-end boost circuit 101, an intermediate DC buck circuit 102 and a rear-end DC-to-AC converting circuit 103. By the front-end boost circuit 101, the input voltage $V_{in}$ generated from a solar cell 2 is converted into a bus voltage $V_{bus}$, which is slightly influenced by the solar beam intensity and has a high DC voltage value (e.g. 400V). By the intermediate DC buck circuit 102, the bus voltage $V_{bus}$ is decreased to a first DC voltage $V_1$ (e.g. 220V). By the rear-end DC-to-AC converting circuit 103, the first DC voltage $V_1$ is converted into an AC output voltage $V_o$. In a case that the intensity of the solar beam is weak and the input voltage $V_{in}$ is too low, the front-end boost circuit 101 may maintain a constant voltage value of the bus voltage $V_{bus}$. Correspondingly, the magnitude of the AC output voltage $V_o$ is not influenced by the intensity of the solar beam.

The photovoltaic inverter 10 is a three-stage converting circuit. As known, the use of front-end boost circuit 101 leads to inferior operating efficiency of the photovoltaic inverter 10. In addition, the photovoltaic inverter 10 is not cost-effective.

Therefore, there is a need of providing a DC-to-AC converting circuit with a wide input voltage range so as to obviate the drawbacks encountered from the prior art.

SUMMARY OF THE INVENTION

The present invention provides a DC-to-AC converting circuit for receiving an input voltage within a wide range and generating an AC output voltage that is not influenced by the intensity of the solar beam. The DC-to-AC converting circuit is a two-stage converting circuit without the front-end boost circuit in order to increase operating efficiency and reduce fabricating cost. Moreover, when the output terminals of the DC-to-AC converting circuit are connected with a customer power network and/or a utility power network system in parallel, the input voltage generated by the solar cell can be converted into AC output voltage, and the AC output voltage can be directly transmitted to the customer power network and/or the utility power network system.

In accordance with an aspect of the present invention, there is provided a DC-to-AC converting circuit with a wide input voltage range for converting an input voltage into an AC output voltage. The DC-to-AC converting circuit includes a transformer, a first modulation switching circuit, a second modulation switching circuit and a third modulation switching circuit, an inverter switching circuit and a controlling unit. The transformer includes a primary side and a secondary side. The primary side includes a first connecting terminal, a second connecting terminal, a third connecting terminal, a first primary winding and a second primary winding. The secondary side includes a secondary winding. The first primary winding and the second primary winding are serially connected with the first, second and third connecting terminals. The first, second and third modulation switching circuits are connected with the first, second and third connecting terminals, respectively. The inverter switching circuit is connected to the secondary side of the transformer for converting the voltage and the current outputted from the secondary winding into an AC output voltage and an AC output current, respectively. The controlling unit is connected to the first, second and third modulation switching circuits and the inverter switching circuit for controlling on/off statuses of the first, second and third modulation switching circuits and the inverter switching circuit, thereby controlling operations of the DC-to-AC converting circuit. Under control of the controlling unit, two of the first, second and third modulation switching circuits are selectively enabled according to the magnitude of the input voltage, so that electric energy of the input voltage is magnetically transmitted to the first primary winding, a second primary winding or a serially-connected winding assembly of the first primary winding and the second primary winding, and a turn ratio of the transformer is adjustable.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
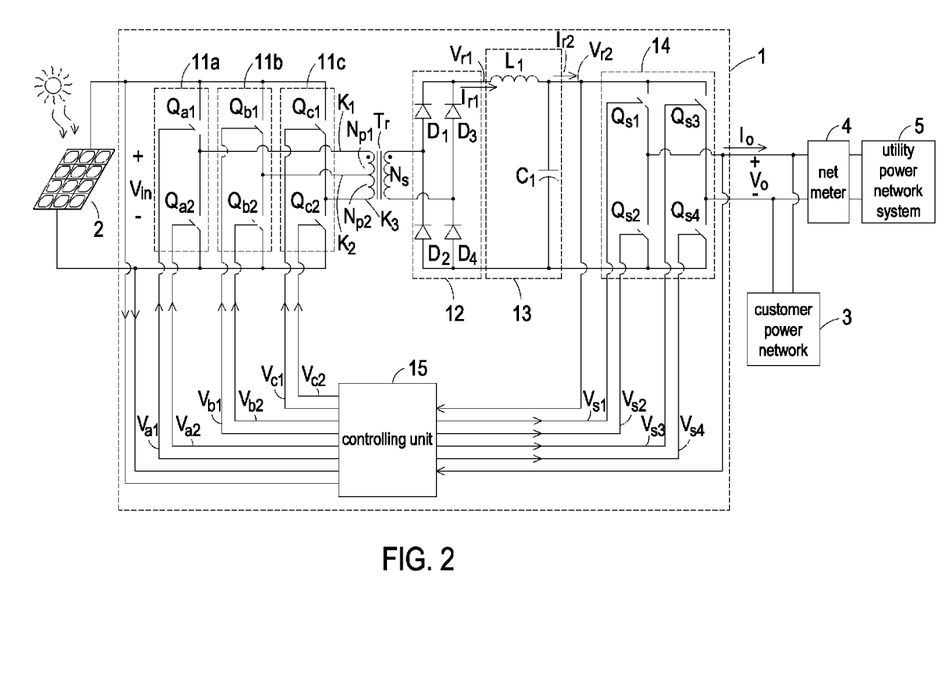
FIG. 2 is a schematic circuit diagram illustrating a DC-to-AC converting circuit with a wide input voltage range according to an embodiment of the present invention.

FIG. 2 is a schematic circuit diagram illustrating a DC-to-AC converting circuit with a wide input voltage range according to an embodiment of the present invention. The DC-to-AC converting circuit 1 is used for receiving an input voltage $V_{in}$ that is generated by a solar cell 2, and converting the input voltage $V_{in}$ into an AC output voltage $V_o$. The AC output voltage $V_o$ is provided to a customer power network 3 or a utility power network system 5 through a net meter 4. As shown in FIG. 2, the DC-to-AC converting circuit 1 includes a transformer $T_r$, three modulation switching circuits 11a, 11b, 11c, a rectifying circuit 12, a filtering circuit 13, an inverter switching circuit 14 and a controlling unit 15.

In this embodiment, the primary side of the transformer $T_r$ includes a first connecting terminal $K_1$, a second connecting terminal $K_2$, a third connecting terminal $K_3$, a first primary winding $N_{p1}$ and a second primary winding $N_{p2}$. The secondary side of the transformer $T_r$ includes a secondary winding $N_s$. The first primary winding $N_{p1}$ is interconnected between the first connecting terminal $K_1$ and the second connecting terminal $K_2$. The second primary winding $N_{p2}$ is interconnected between the second connecting terminal $K_2$ and the third connecting terminal $K_3$. That is, the first primary winding $N_{p1}$ and the second primary winding $N_{p2}$ are connected in series.

The two input terminals of the first modulation switching circuit 11a are respectively connected to the positive terminal and the negative terminal of the solar cell 2 (i.e. the positive input terminal and the negative input terminal of the DC-to-AC converting circuit 1). The output terminal of the first modulation switching circuit 11a is connected to the first connecting terminal $K_1$. The two input terminals of the second modulation switching circuit 11b are respectively connected to the positive terminal and the negative terminal of the solar cell 2. The output terminal of the second modulation switching circuit 11b is connected to the second connecting terminal $K_2$. The two input terminals of the third modulation switching circuit 11c are respectively connected to the positive terminal and the negative terminal of the solar cell 2. The output terminal of the third modulation switching circuit 11c is connected to the third connecting terminal $K_3$. In this embodiment, the first modulation switching circuit 11a includes a first switch element $Q_{a1}$ and a second switch element $Q_{a2}$; the second modulation switching circuit 11b includes a third switch element $Q_{b1}$ and a fourth switch element $Q_{b2}$; and the third modulation switching circuit 11c includes a fifth switch element $Q_{c1}$ and a sixth switch element $Q_{c2}$. The control terminals of these six switch elements are connected to the controlling unit 15.

Under control of the controlling unit 15, the first switch element $Q_{a1}$, the second switch element $Q_{a2}$, the third switch element $Q_{b1}$, the fourth switch element $Q_{b2}$, the fifth switch element $Q_{c1}$ and the sixth switch element $Q_{c2}$ are turn-on or turn-off according to a first pulse width modulation (PWM) signal $V_{a1}$, a second PWM signal $V_{a2}$, a third PWM signal $V_{b1}$, a fourth PWM signal $V_{b2}$, a fifth PWM signal $V_{c1}$ and a sixth PWM signal $V_{c2}$ issued by the controlling unit 15.

In this embodiment, the rectifying circuit 12 is a bridge-type rectifying circuit. The rectifying circuit 12 includes a first diode $D_1$, a second diode $D_2$, a third diode $D_3$ and a fourth $D_4$. The rectifying circuit 12 is interconnected between the secondary side of the transformer $T_r$ and the rectifying circuit 13. By the rectifying circuit 12, the voltage and current outputted from the secondary winding $N_s$ of the transformer $T_r$ are rectified into a first full-wave rectified voltage $V_{r1}$ and a first full-wave rectified current $I_{r1}$, respectively.

In this embodiment, the filtering circuit 13 is a low-pass filtering circuit. The filtering circuit 13 includes a first inductor $L_1$ and a first capacitor $C_1$. The filtering circuit 13 is used for filtering off the high-frequency components contained in the first full-wave rectified voltage $V_{r1}$ and the first full-wave rectified current $I_{r1}$, thereby generating a second full-wave rectified voltage $V_{r2}$ and a second full-wave rectified current $I_{r2}$, respectively. The first inductor $L_1$ is interconnected between the positive output terminal of the rectifying circuit 12 and the positive input terminal of the inverter switching circuit 14. The first capacitor $C_1$ is interconnected between the positive input terminal and the negative input terminal of the inverter switching circuit 14.

The inverter switching circuit 14 is connected to the filtering circuit 13 and the customer power network 3. By the inverter switching circuit 14, the second full-wave rectified voltage $V_{r2}$ and the second full-wave rectified current $I_{r2}$ are converted into the AC output voltage $V_o$ and a corresponding AC output current $I_o$, respectively. In this embodiment, the inverter switching circuit 14 includes a seventh switch element $Q_{s1}$, an eighth switch element $Q_{s2}$, a ninth switch element $Q_{s3}$ and a tenth switch element $Q_{s4}$. The control terminals of these four switch elements are connected to the controlling unit 15. Under control of the controlling unit 15, the seventh switch element $Q_{s1}$, the eighth switch element $Q_{s2}$, the ninth switch element $Q_{s3}$ and the tenth switch element $Q_{s4}$ are turn-on or turn-off according to a first inverting signal $V_{s1}$, a second inverting signal $V_{s2}$, a third inverting signal $V_{s3}$ and a fourth inverting signal $V_{s4}$.

Moreover, the positive terminal of the solar cell 2, the negative terminal of the solar cell 2, the positive input terminal of the inverter switching circuit 14 and the negative input terminal of the inverter switching circuit 14 are also connected to the controlling unit 15. Under control of the controlling unit 15, the first modulation switching circuit 11a, the second modulation switching circuit 11b, the third modulation switching circuit 11c and the inverter switching circuit 14 are enabled or disabled according to the input voltage $V_{in}$, the second full-wave rectified voltage $V_{r2}$ and the AC output voltage $V_o$, or according to the second full-wave rectified current $I_{r2}$ and the AC output current $I_o$.

Figure 3A:
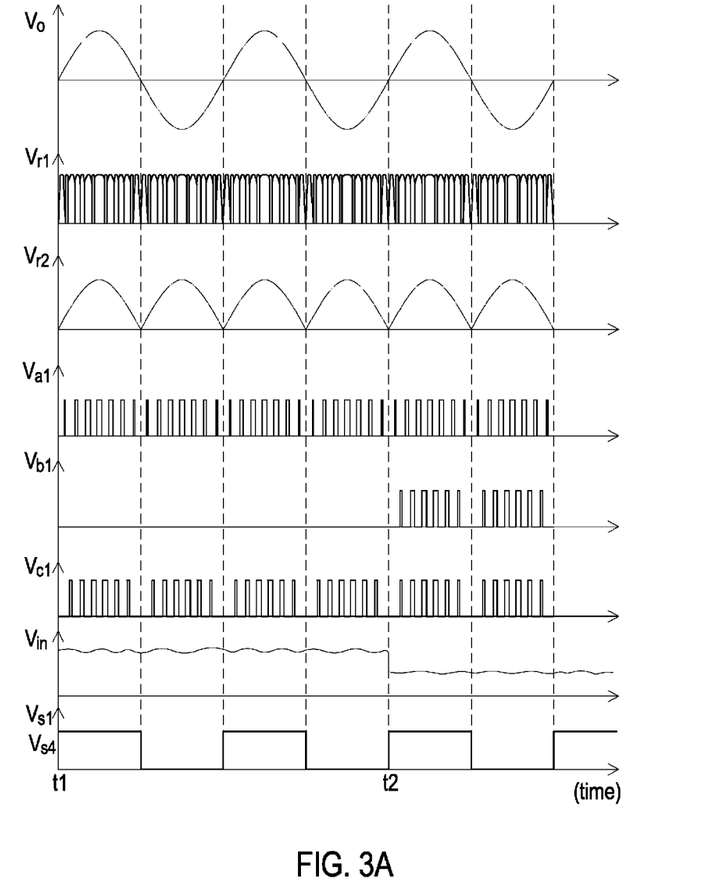
FIG. 3A is a schematic timing waveform diagram illustrating associated voltage signals and control signals processed by the DC-to-AC converting circuit as shown in FIG. 2.
Figure 3B:
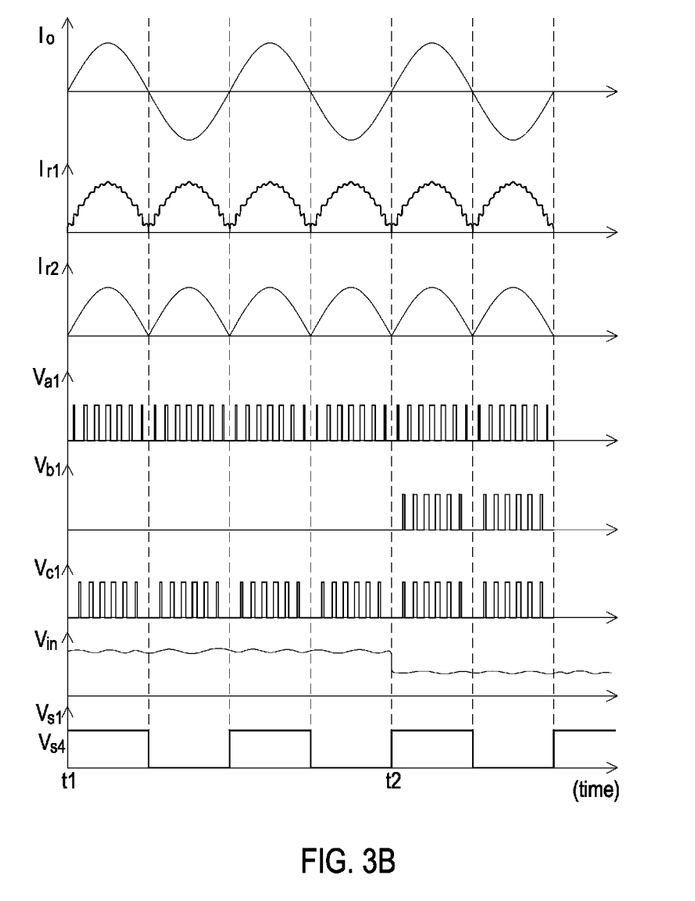
FIG. 3B is a schematic timing waveform diagram illustrating associated current signals and control signals processed by the DC-to-AC converting circuit as shown in FIG. 2.

FIG. 3A is a schematic timing waveform diagram illustrating associated voltage signals and control signals processed by the DC-to-AC converting circuit as shown in FIG. 2. FIG. 3B is a schematic timing waveform diagram illustrating associated current signals and control signals processed by the DC-to-AC converting circuit as shown in FIG. 2. Please refer to FIGS. 3A and 3B. From a first time spot $t_1$ to a second time spot $t_2$, the solar cell 2 absorbs sufficient solar energy and generates an input voltage $V_{in}$ of 410V, which is higher than a first setting voltage value (e.g. 205V). In this situation, the first PWM signal $V_{a1}$, the second PWM signal $V_{a2}$, the fifth PWM signal $V_{c1}$ and the sixth PWM signal $V_{c2}$ are in a disabled or enabled state (e.g. a high-level or low-level state), and varied in a PWM manner. Whereas, the third PWM signal $V_{b1}$ and the fourth PWM signal $V_{b2}$ are continuously in a disabled state. The first PWM signal $V_{a1}$ and the sixth PWM signal $V_{c2}$ are synchronous. The first PWM signal $V_{a1}$ and the second PWM signal $V_{a2}$ are complementary. The fifth PWM signal $V_{c1}$ and the sixth PWM signal $V_{c2}$ are complementary.

From the first time spot $t_1$ to the second time spot $t_2$, under control of the controlling unit 15, the first switch element $Q_{a1}$, the second switch element $Q_{a2}$, the fifth switch element $Q_{c1}$ and the sixth switch element $Q_{c2}$ are enabled but the third switch element $Q_{b1}$ and the fourth switch element $Q_{b2}$ are disabled. During the time interval from the first time spot $t_1$ to the second time spot $t_2$, the first PWM signal $V_{a1}$ and the sixth PWM signal $V_{c2}$ are in the enabled state, but the second PWM signal $V_{a2}$ and the fifth PWM signal $V_{c1}$ are in the disabled state. As such, the input voltage $V_{in}$ is transmitted to the serially-connected winding assembly $(N_{p1}+N_{p2})$ of the first primary winding $N_{p1}$ and the second primary winding $N_{p2}$ through the first switch element $Q_{a1}$ and the sixth switch element $Q_{c2}$. In this situation, the serially-connected winding assembly $(N_{p1}+N_{p2})$ will receive the positive component of the input voltage $V_{in}$. On the other hand, if the second PWM signal $V_{a2}$ and the fifth PWM signal $V_{c1}$ are in the enabled state but the first PWM signal $V_{a1}$ and the sixth PWM signal $V_{c2}$ are in the disabled state, the input voltage $V_{in}$ is transmitted to the serially-connected winding assembly $(N_{p1}+N_{p2})$ of the first primary winding $N_{p1}$ and the second primary winding $N_{p2}$ through the fifth switch element $Q_{c1}$ and the second switch element $Q_{a2}$. In this situation, the serially-connected winding assembly $(N_{p1}+N_{p2})$ will receive the negative component of the input voltage $V_{in}$.

Since the first primary winding $N_{p1}$ and the second primary winding $N_{p2}$ in the primary side of the transformer $T_r$ are connected in series to form the serially-connected winding assembly $(N_{p1}+N_{p2})$, the electric energy of the input voltage $V_{in}$ will be magnetically transmitted to the secondary winding $N_s$ through the serially-connected winding assembly $(N_{p1}+N_{p2})$. For the transformer $T_r$, a first ratio of the induced voltage in the secondary side to the voltage in the primary side is equal to a turn ratio of the secondary winding $N_s$ to the serially-connected winding assembly $(N_{p1}+N_{p2})$. In this embodiment, the first ratio is given when the equivalent turn number in the secondary side is divided by the equivalent turn number in the primary side.

After the second time spot $t_2$, the intensity of the solar beam is so weak that the input voltage $V_{in}$ is lower than the first setting voltage value (e.g. 205V). In this situation, the first PWM signal $V_{a1}$, the second PWM signal $V_{a2}$, the third PWM signal $V_{b1}$ and the fourth PWM signal $V_{b2}$ are in a disabled or enabled state (e.g. a high-level or low-level state), and varied in a PWM manner. Whereas, the fifth PWM signal $V_{c1}$ and the sixth PWM signal $V_{c2}$ are continuously in a disabled state. The first PWM signal $V_{a1}$ and the fourth PWM signal $V_{b2}$ are synchronous. The first PWM signal $V_{a1}$ and the second PWM signal $V_{a2}$ are complementary. The third PWM signal $V_{b1}$ and the fourth PWM signal $V_{b2}$ are complementary.

After the second time spot $t_2$, under control of the controlling unit 15, the first switch element $Q_{a1}$, the second switch element $Q_{a2}$, the third switch element $Q_{b1}$, the fourth switch element $Q_{b2}$ are enabled but the fifth switch element $Q_{c1}$ and the sixth switch element $Q_{c2}$ are disabled. During the time interval, the first PWM signal $V_{a1}$ and the fourth PWM signal $V_{b2}$ are in the enabled state but the second PWM signal $V_{a2}$ and the third PWM signal $V_{b1}$ are in the disabled state. As such, the input voltage $V_{in}$ is transmitted to the first primary winding $N_{p1}$ through the first switch element $Q_{a1}$ and the fourth switch element $Q_{b2}$. In this situation, the first primary winding $N_{p1}$ will receive the positive component of the input voltage $V_{in}$. On the other hand, if the second PWM signal $V_{at}$ and the third PWM signal $V_{b1}$ are in the enabled state but the first PWM signal $V_{a1}$ and the fourth PWM signal $V_{b2}$ are in the disabled state, the input voltage $V_{in}$ is transmitted to the first primary winding $N_{p1}$ through the third switch element $Q_{b1}$ and the second switch element $Q_{a2}$. In this situation, the first primary winding $N_{p1}$ will receive the negative component of the input voltage $V_{in}$.

Since only the first primary winding $N_{p1}$ is operated in primary side of the transformer $T_r$, the electric energy of the input voltage $V_{in}$ will be magnetically transmitted to the secondary winding $N_s$ through the first primary winding $N_{p1}$. For the transformer $T_r$, a second ratio of the induced voltage in the secondary side to the voltage in the primary side is equal to a turn ratio of the secondary winding $N_s$ to the first primary winding $N_{p1}$. Since the turn number of the serially-connected winding assembly $(N_{p1}+N_{p2})$ is greater than the turn number of the first primary winding $N_{p1}$, the first ratio is smaller than the second ratio. For example, assuming that the turn numbers of the first primary winding $N_{p1}$, the second primary winding $N_{p2}$ and the secondary winding $N_s$ are respectively 2, 2 and 4, the first ratio is equal to 1 (i.e. 4/(2+2)=1) and the second ratio is equal to 2 (i.e. 4/2=2).

In a case that the intensity of the solar beam is strong enough and the input voltage $V_{in}$ is higher than the first setting voltage value, under control of the controlling unit 15, the first modulation switching circuit 11a and the third modulation switching circuit 11c are operated in a PWM manner but the second modulation switching circuit 11b is disabled. In this situation, the transformer $T_r$ is operated in the first ratio to magnetically transmit the electric energy of the input voltage $V_{in}$ from the primary side to the secondary side. Whereas, in a case that the intensity of the solar beam is weak and the input voltage $V_{in}$ is lower than the first setting voltage value, under control of the controlling unit 15, the first modulation switching circuit 11a and the second modulation switching circuit 11b are operated in a PWM manner but the third modulation switching circuit 11c is disabled. In this situation, the transformer $T_r$ is operated in the second ratio to magnetically transmit the electric energy of the input voltage $V_{in}$ from the primary side to the secondary side. Although the input voltage $V_{in}$ is relatively lower, the electric energy of the input voltage $V_{in}$ is magnetically transmitted from the primary side to the secondary side of the transformer $T_r$ because of the higher second ratio. As a consequence, the root mean square (rms) of the second full-wave rectified voltage $V_{r2}$ or the AC output voltage $V_o$ is still maintained at the rated voltage value (e.g. 110V) without being influenced by the intensity of the solar beam.

In some embodiments, if intensity of the solar beam is weak and the input voltage $V_{in}$ is lower than the first setting voltage value, under control of the controlling unit 15, the second modulation switching circuit 11b and the third modulation switching circuit 11c are operated in a PWM manner but the first modulation switching circuit 11a is disabled. The input voltage $V_{in}$ is transmitted to the second primary winding $N_{p2}$ through the third switch element $Q_{b1}$ and the sixth switch element $Q_{c2}$, so that the second primary winding $N_{p2}$ will receive the positive component of the input voltage $V_{in}$. In addition, the input voltage $V_{in}$ is transmitted to the second primary winding $N_{p2}$ through the fifth switch element $Q_{c1}$ and the fourth switch element $Q_{b2}$, so that the second primary winding $N_{p2}$ will receive the negative component of the input voltage V. For the transformer $T_r$, a third ratio of the induced voltage in the secondary side to the voltage in the primary side is equal to a turn ratio of the second primary winding $N_{p2}$ to the secondary winding $N_s$. Since the turn number of the serially-connected winding assembly $(N_{p1}+N_{p2})$ is greater than the turn number of the second primary winding $N_{p2}$, the first ratio is smaller than the third ratio. As such, the transformer $T_r$ is operated in the third ratio to magnetically transmit the electric energy of the input voltage $V_{in}$ from the primary side to the secondary side. In an embodiment, the turn number of the first primary winding $N_{p1}$ and the second primary winding $N_{p2}$ are identical, so that the second ratio is equal to the third ratio.

Under control of the controlling unit 15, two of the three modulation switching circuits 11a, 11b and 11c are enabled according to the second full-wave rectified voltage $V_{r2}$, the input voltage $V_{in}$ and the AC output voltage $V_o$. Moreover, under control of the controlling unit 15, the duty cycles of the PWM signals $V_{a1}$, $V_{a2}$, $V_{b1}$, $V_{b2}$, $V_{c1}$ and $V_{c2}$ are adjustable according to the second full-wave rectified voltage $V_{r2}$, the AC output voltage $V_o$, the second full-wave rectified current $I_{r2}$ and the AC output current $I_o$. As a consequence, the peak value of the second full-wave rectified voltage $V_{r2}$, the effective value of the AC output voltage $V_o$ or the peak value of the AC output voltage $V_o$ is still maintained at the rated voltage value without being influenced by the intensity of the solar beam.

In this embodiment, the modulation switching circuits 11a, 11b and 11c are operated at a frequency of 20 kHz, and the inverter switching circuit 14 is operated at a frequency of 60 Hz, which is equal to the frequency of the AC output voltage $V_o$. Since the operating frequencies of the modulation switching circuits 11a, 11b and 11c are relatively high, the first full-wave rectified voltage $V_{r1}$ and the first full-wave rectified current $I_{r1}$ contain high-frequency components. After the high-frequency components contained in the first full-wave rectified voltage $V_{r1}$ and the first full-wave rectified current $I_{r1}$ are filtered off by the filtering circuit 13, the second full-wave rectified voltage $V_{r2}$ and a second full-wave rectified current $I_{r2}$ are generated. By the inverter switching circuit 14, the second full-wave rectified voltage $V_{r2}$ and the second full-wave rectified current $I_{r2}$ are converted into the AC output voltage $V_o$ and a corresponding AC output current $I_o$, respectively. As shown in FIG. 3B, the duty cycles of the PWM signals $V_{a1}$, $V_{a2}$, $V_{b1}$, $V_{b2}$, $V_{c1}$ and $V_{c2}$ are adjustable according to the AC output current $I_o$, which has a sinusoid or cosine waveform. That is, from the peak value of the AC output current $I_o$ to the zero voltage, the duty cycle of the PWM signal ($V_{a1}$, $V_{a2}$, $V_{b1}$, $V_{b2}$, $V_{c1}$, $V_{c2}$) is gradually decreased, and thus the duty cycle of the corresponding switch elements ($Q_{a1}$, $Q_{a2}$, $Q_{b1}$, $Q_{b2}$, $Q_{c1}$, $Q_{c2}$, $Q_{s1}$, $Q_{s2}$, $Q_{s3}$, $Q_{s4}$) is gradually decreased.

In a case that the DC-to-AC converting circuit 1 is connected with the customer power network 3 and the utility power network system 5 in parallel, the frequency of the inverting signal ($V_{s1}$, $V_{s2}$, $V_{s3}$, $V_{s4}$) and the operating frequency of the inverter switching circuit 14 are controlled by the controlling unit 15 to be the same as the frequency of the AC output voltage $V_o$ and synchronous with the frequency of the AC output voltage $V_o$ according to the AC output voltage $V_o$. In this embodiment, the first inverting signal $V_{s1}$ and the fourth inverting signal $V_{s4}$ are synchronous; the second inverting signal $V_{s2}$ and the third inverting signal $V_{s3}$ are synchronous; the first inverting signal $V_{s1}$ and the second inverting signal $V_{s2}$ are complementary; and the third inverting signal $V_{s3}$ and the fourth inverting signal $V_{s4}$ are complementary.

In a case that the first inverting signal $V_{s1}$ and the fourth inverting signal $V_{s4}$ are in the enabled state but the second inverting signal $V_{s2}$ and the third inverting signal $V_{s3}$ are in the disabled state, the second full-wave rectified voltage $V_{r2}$ is transmitted to the customer power network 3 and the utility power network system 5 through the seventh switch element $Q_{s1}$ and the tenth switch element $Q_{s4}$. In a case that the second inverting signal $V_{s2}$ and the third inverting signal $V_{s3}$ are in the enabled state but the first inverting signal $V_{s1}$ and the fourth inverting signal $V_{s4}$ are in the disabled state, the second full-wave rectified voltage $V_{r2}$ is transmitted to the customer power network 3 and the utility power network system 5 through the ninth switch element $Q_{s3}$ and the eighth switch element $Q_{s2}$. By the inverter switching circuit 14, the AC output voltage $V_o$ and the AC output current $I_o$ are generated.

In this embodiment, the controlling unit 15 can acquire the rated voltage value and the rated frequency value of the AC output voltage $V_o$ by detecting the AC output voltage $V_o$. According to the rated voltage value and the rated frequency value of the AC output voltage $V_o$, the operations of the modulation switching circuits 11a, 11b and 11c and the inverter switching circuit 14 are controlled by the controlling unit 15. As a consequence, the DC-to-AC converting circuit 1 of the present invention can be applied to various utility power network systems 5.

Figure 4:
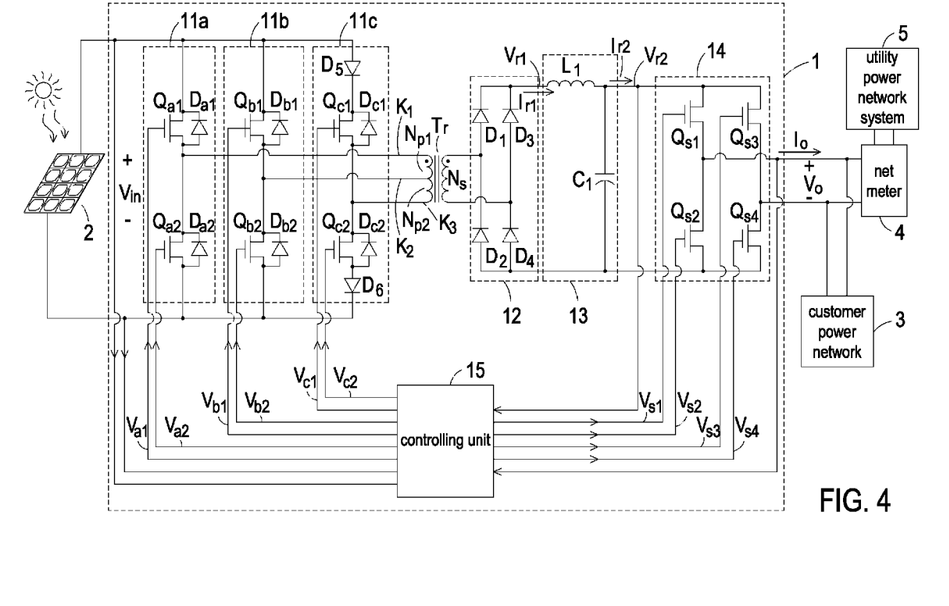
FIG. 4 is a schematic circuit diagram illustrating a DC-to-AC converting circuit with a wide input voltage range according to another embodiment of the present invention.

FIG. 4 is a schematic circuit diagram illustrating a DC-to-AC converting circuit with a wide input voltage range according to another embodiment of the present invention. In comparison with FIG. 2, the DC-to-AC converting circuit of FIG. 4 further includes a first body diode $D_{a1}$ and a second body diode $D_{a2}$ in the first modulation switching circuit 11a, a third body diode $D_{b1}$ and a fourth body diode $D_{b2}$ in the second modulation switching circuit 11b; and a fifth body diode $D_{c1}$, a sixth body diode $D_{c2}$, a fifth diode $D_5$ and a sixth diode $D_6$ in the third modulation switching circuit 11c. In this embodiment, the switch elements $Q_{a1}$, $Q_{a2}$, $Q_{b1}$, $Q_{b2}$, $Q_{c1}$, $Q_{c2}$, $Q_{s1}$, $Q_{s2}$, $Q_{s3}$ and $Q_{s4}$ are metal oxide semiconductor field effect transistors (MOSFETs).

The first body diode $D_{a1}$, the second body diode $D_{a2}$, the third body diode $D_{b1}$, the fourth body diode $D_{b2}$, the fifth body diode $D_{c1}$ and the sixth body diode $D_{c2}$ are respectively connected to the first switch element $Q_{a1}$, the second switch element $Q_{a2}$, the third switch element $Q_{b1}$, the fourth switch element $Q_{b2}$, the fifth switch element $Q_{c1}$ and the sixth switch element $Q_{c2}$. As such, when the switch elements ($Q_{a1}$, $Q_{a2}$, $Q_{b1}$, $Q_{b2}$, $Q_{c1}$, $Q_{c2}$, $Q_{s1}$, $Q_{s2}$, $Q_{s3}$, $Q_{s4}$) are turn-off, a corresponding magnetizing current path of the transformer $T_r$ is generated. Via the magnetizing current path, the energy generated by the transformer $T_r$ is returned to the input terminal of the DC-to-AC converting circuit. A fifth diode $D_5$ is connected with the fifth switch element $Q_{c1}$ in series. A sixth diode $D_6$ is connected with the sixth switch element $Q_{c2}$ in series. In a case that the first modulation switching circuit 11a and the second modulation switching circuit 11b are enabled but the third modulation switching circuit 11c is disabled, the fifth diode $D_5$ and the sixth diode $D_6$ can prevent the electric energy of the primary side of the transformer $T_r$ from turning on the fifth switch element $Q_{c1}$ and the sixth switch element $Q_{c2}$.

In the above embodiments, each of the switch elements $Q_{a1}$, $Q_{a2}$, $Q_{b1}$, $Q_{b2}$, $Q_{c1}$, $Q_{c2}$, $Q_{s1}$, $Q_{s2}$, $Q_{s3}$ and $Q_{s4}$ includes but is not limited to a metal oxide semiconductor field effect transistor (MOSFET), a bipolar junction transistor (BJT) or an insulated gate bipolar transistor (IGBT). An example of the controlling unit 15 includes but is not limited to a digital signal processor (DSP) or a PWM controller.

From the above description, the DC-to-AC converting circuit of the present invention is a two-stage converting circuit. The first stage of the DC-to-AC converting circuit principally includes the modulation switching circuits, the transformer, the rectifying circuit and the filtering circuit. The second stage of the DC-to-AC converting circuit principally includes the inverter switching circuit. Without the need of using a front-end boost circuit, the DC-to-AC converting circuit of the present invention can receive a wide range of input voltage, wherein the magnitude of the AC output voltage is not influenced by the intensity of the solar beam. As a consequence, the DC-to-AC converting circuit has high operating efficiency and is cost-effective. Moreover, when the output terminals of the DC-to-AC converting circuit are connected with a customer power network and/or a utility power network system in parallel, the input voltage generated by the solar cell can be converted into AC output voltage, and the AC output voltage can be directly transmitted to the customer power network and/or the utility power network system. Through the utility power network system, the AC output voltage can be provided to the household users. In other words, the DC-to-AC converting circuit of the present invention can provide not only self-production power but also utility power. The DC-to-AC converting circuit can be considered as a small-sized solar generator for establishing a distributed power supply system. By measuring the net electricity with the net meter, the user of the DC-to-AC converting circuit can collect electricity-generation fees from the power company.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A DC-to-AC converting circuit with a wide input voltage range for converting an input voltage into an AC output voltage, said DC-to-AC converting circuit comprising:
   a transformer comprising a primary side and a secondary side, said primary side comprising a first connecting terminal, a second connecting terminal, a third connecting terminal, a first primary winding and a second primary winding, said secondary side comprising a secondary winding, wherein said first primary winding and said second primary winding are serially connected with said first, second and third connecting terminals;
   a first modulation switching circuit, a second modulation switching circuit and a third modulation switching circuit connected with said first, second and third connecting terminals, respectively;
   an inverter switching circuit connected to said secondary side of said transformer for converting voltage and current outputted from said secondary winding into an AC output voltage and an AC output current, respectively; and
   a controlling unit connected to said first, second and third modulation switching circuits and said inverter switching circuit for controlling on/off statuses of said first, second and third modulation switching circuits and said inverter switching circuit, thereby controlling operations of said DC-to-AC converting circuit,
   wherein under control of said controlling unit, two of said first, second and third modulation switching circuits are selectively enabled according to the magnitude of said input voltage, so that electric energy of said input voltage is magnetically transmitted to said first primary winding, a second primary winding or a serially-connected winding assembly of said first primary winding and said second primary winding, and a turn ratio of said transformer is adjustable.

2. The DC-to-AC converting circuit according to claim 1, further comprising:
   a rectifying circuit connected to said secondary side of said transformer for rectifying said voltage and said current outputted from said secondary winding into a first rectified voltage and a first rectified current, respectively; and
   a filtering circuit connected to said rectifying circuit and said inverter switching circuit for filtering off high-frequency components contained in said first rectified voltage and said first rectified current, thereby generating a second rectified voltage and a second rectified current, respectively,
   wherein said inverter switching circuit is configured to convert said second rectified voltage and said second rectified current into said AC output voltage and said AC output current, respectively.

3. The DC-to-AC converting circuit according to claim 2, wherein said rectifying circuit is a bridge-type rectifying circuit comprising a first diode, a second diode, a third diode and a fourth diode.

4. The DC-to-AC converting circuit according to claim 2, wherein said first rectified voltage, said first rectified current, said second rectified voltage and said second rectified current are in a full-wave form.

5. The DC-to-AC converting circuit according to claim 1, wherein two of said first, second and third modulation switching circuits are selectively enabled under control of said controlling unit according to a comparison result between the magnitude of said input voltage and a first setting voltage value, so that electric energy of said input voltage is magnetically transmitted to said first primary winding, a second primary winding or a serially-connected winding assembly of said first primary winding and said second primary winding.

6. The DC-to-AC converting circuit according to claim 5, wherein if the magnitude of said input voltage is higher than said first setting voltage value, under control of said controlling unit, said first and third modulation switching circuits are operated in a pulse width modulation mode but said second modulation switching circuit is disabled, so that said turn ratio of said transformer is equal to a first ratio, wherein said first ratio is equal to a turn number of said secondary winding to a turn number of said serially-connected winding assembly of said first primary winding and said second primary winding.

7. The DC-to-AC converting circuit according to claim 6, wherein if the magnitude of said input voltage is higher than said first setting voltage value, said electric energy of said input voltage is magnetically transmitted to said serially-connected winding assembly of said first primary winding and said second primary winding.

8. The DC-to-AC converting circuit according to claim 6, wherein if the magnitude of said input voltage is lower than said first setting voltage value, under control of said controlling unit, said first and second modulation switching circuits are operated in said pulse width modulation mode but said third modulation switching circuit is disabled, so that said turn ratio of said transformer is equal to a second ratio, wherein said second ratio is greater than said first ratio.

9. The DC-to-AC converting circuit according to claim 8, wherein if the magnitude of said input voltage is lower than said first setting voltage value, said electric energy of said input voltage is magnetically transmitted to said first primary winding, wherein said second ratio is equal to a turn number of said first primary winding to a turn number of said secondary winding.

10. The DC-to-AC converting circuit according to claim 6, wherein if the magnitude of said input voltage is lower than said first setting voltage value, under control of said controlling unit, said second and third modulation switching circuits are operated in said pulse width modulation mode but said first modulation switching circuit is disabled, so that said turn ratio of said transformer is equal to a third ratio, wherein said third ratio is greater than said first ratio.

11. The DC-to-AC converting circuit according to claim 10, wherein if the magnitude of said input voltage is lower than said first setting voltage value, said electric energy of said input voltage is magnetically transmitted to said second primary winding, wherein said third ratio is equal to a turn number of said second primary winding to a turn number of said secondary winding.

12. The DC-to-AC converting circuit according to claim 1, wherein said first modulation switching circuit comprises a first switch element and a second switch element, said second modulation switching circuit comprises a third switch element and a fourth switch element, said third modulation switching circuit comprises a fifth switch element and a sixth switch element, wherein said first, second, third, fourth, fifth and sixth switch elements have respective control terminals connected to said controlling unit.

13. The DC-to-AC converting circuit according to claim 12, wherein if the magnitude of said input voltage is higher than said first setting voltage value, said electric energy of said input voltage is transmitted to said serially-connected winding assembly of said first primary winding and said second primary winding through said first switch element and said sixth switch element such that said serially-connected winding assembly receives a positive component of said input voltage, or said electric energy of said input voltage is transmitted to said serially-connected winding assembly through said fifth switch element and said second switch element such that said serially-connected winding assembly receives a negative component of said input voltage.

14. The DC-to-AC converting circuit according to claim 13, wherein if the magnitude of said input voltage is lower than said first setting voltage value, said electric energy of said input voltage is transmitted to said first primary winding through said first switch element and said fourth switch element such that said first primary winding receives said positive component of said input voltage, or said electric energy of said input voltage is transmitted to said first primary winding through said third switch element and said second switch element such that said first primary winding receives said negative component of said input voltage.

15. The DC-to-AC converting circuit according to claim 13, wherein if the magnitude of said input voltage is lower than said first setting voltage value, said electric energy of said input voltage is transmitted to said second primary winding through said third switch element and said sixth switch element such that said second primary winding receives said positive component of said input voltage, or said electric energy of said input voltage is transmitted to said second primary winding through said fifth switch element and said fourth switch element such that said second primary winding receives said negative component of said input voltage.

16. The DC-to-AC converting circuit according to claim 12, further comprising first, second, third, fourth, fifth and sixth body diodes, which are respectively connected to said first, second, third, fourth, fifth and sixth switch elements.

17. The DC-to-AC converting circuit according to claim 12, wherein said third modulation switching circuit further comprising a fifth diode serially connected to said fifth switch element and a sixth diode serially connected to said sixth switch element.

18. The DC-to-AC converting circuit according to claim 1, wherein said controlling unit is a digital signal processor or a pulse width modulation controller.

19. The DC-to-AC converting circuit according to claim 1, wherein said input voltage is generated by a solar cell, said DC-to-AC converting circuit is connected with a customer power network and/or a utility power network system in parallel, and the operating frequency of said inverter switching circuit is controlled by said controlling unit to be the same as and synchronous with said AC output voltage according to said AC output voltage.

20. The DC-to-AC converting circuit according to claim 19, wherein said controlling unit acquires a rated voltage value and a rated frequency value of said AC output voltage by detecting said AC output voltage, and the operations of said first, second and third modulation switching circuits and said inverter switching circuit are controlled by said controlling unit according to said rated voltage value and said rated frequency value of said AC output voltage.

21. The DC-to-AC converting circuit according to claim 1, wherein from a peak value of said AC output current to a zero voltage, the duty cycles of said first, second and third modulation switching circuits are gradually decreased.

* * * * *